United States Patent
Thomas et al.

(10) Patent No.: US 10,248,648 B1
(45) Date of Patent: Apr. 2, 2019

(54) DETERMINING WHETHER A COMMENT REPRESENTED AS NATURAL LANGUAGE TEXT IS PRESCRIPTIVE

(71) Applicant: Glint Inc., Redwood City, CA (US)

(72) Inventors: Christopher Johannes Thomas, Menlo Park, CA (US); Chih Po Wen, Redwood City, CA (US); Goutham Kurra, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/475,015

(22) Filed: Mar. 30, 2017

Related U.S. Application Data

(60) Provisional application No. 62/360,618, filed on Jul. 11, 2016.

(51) Int. Cl.
*G06F 17/27* (2006.01)

(52) U.S. Cl.
CPC ........ *G06F 17/2785* (2013.01); *G06F 17/274* (2013.01); *G06F 17/2705* (2013.01); *G06F 17/2735* (2013.01)

(58) Field of Classification Search
CPC .................. G06F 17/2765; G06F 17/2785
See application file for complete search history.

(56) References Cited

U.S. PATENT DOCUMENTS

| | | | | |
|---|---|---|---|---|
| 9,569,729 B1* | 2/2017 | Oehrle | ................. | G06Q 10/063 |
| 10,037,491 B1* | 7/2018 | Fang | ........................ | G06N 5/04 |
| 2009/0306967 A1* | 12/2009 | Nicolov | .............. | G06F 17/2785 |
| | | | | 704/9 |
| 2012/0245925 A1* | 9/2012 | Guha | ...................... | G06F 17/27 |
| | | | | 704/9 |
| 2015/0106157 A1* | 4/2015 | Chang | ................ | G06Q 30/0201 |
| | | | | 705/7.29 |
| 2015/0378987 A1* | 12/2015 | Sekar | .................. | G06F 17/3061 |
| | | | | 704/9 |
| 2017/0004184 A1* | 1/2017 | Jain | ...................... | G06F 17/2735 |
| 2017/0199866 A1* | 7/2017 | Gunaratna | ............ | G06F 17/271 |
| 2017/0337640 A1* | 11/2017 | Subramanian | ...... | G06F 17/2785 |

\* cited by examiner

*Primary Examiner* — Brian L Albertalli
(74) *Attorney, Agent, or Firm* — Hickman Palermo Becker Bingham LLP

(57) ABSTRACT

An online system receives comments provided by users and analyzes them. The users may be associated with an organization, for example, employees of an enterprise may provide comments related to the enterprise. The online system classifies the comments to determine whether the comments are prescriptive or non-prescriptive. The online system may generate reports based on the classification of the comments. The online system may use a machine learning model for classifying the comments. The features used for the machine learning model include an indication of whether the input comment is associated with a question, n-grams from the comment, location of verbs in sentences, and so on.

20 Claims, 5 Drawing Sheets

DETERMINING WHETHER A COMMENT REPRESENTED AS NATURAL LANGUAGE TEXT IS PRESCRIPTIVE

CROSS REFERENCE TO RELATED APPLICATION

This application claims the benefit of U.S. Provisional Application No. 62/360,618, filed on Jul. 11, 2016, which is incorporated by reference in its entirety.

BACKGROUND

This invention relates in general to classification of comments represented as natural language text, and more specifically to using machine learning for processing comments represented as natural language text to determine whether a comment is prescriptive.

Online systems receive and process large amount of information represented as text. For example, an online system may be used by an enterprise to allow human resource department to interact with the employees or to allow employees to interact with each other. These systems receive text provided by the users of the online system. For example, an online system implementing an online forum receives comments from users, a system managing surveys presented to users receives replies from users to questions presented in the survey.

These systems often analyze the textual information to infer high level semantic information represented by the text. For example, a system receiving results of a survey from users may analyze the results to generate a report summarizing results of the survey. Textual information is often received in the form of natural language. Conventional techniques for analyzing textual information represented as natural language often fail to extract various types of semantic information from the textual information.

SUMMARY

An online system receives comments provided by users and analyzes them. The users may be associated with an organization, for example, employees of an enterprise may provide comments related to the enterprise. The online system classifies the comments to determine whether the comments are prescriptive or non-prescriptive. Prescriptive comments specify actions to be performed. For example, a prescriptive comment from an employee may suggest that the enterprise should have fewer meetings, or the enterprise should hire in a particular department, and the like. The online system may generate reports based on the classification of the comments. The classification of comments into prescriptive and non-prescriptive comments simplifies further analysis of the comments by allowing the online system to filter comments that are more likely to be of interest for analysis.

In an embodiment, the online system generates a machine learning model configured to receive an input comment and classify the input comment as being prescriptive or non-prescriptive. The prescriptive comment may be conditionally prescriptive or unconditionally prescriptive. A prescriptive comment is conditionally prescriptive if the comment is prescriptive in the context of a question associated with the comment. A prescriptive comment is unconditionally prescriptive if the comment represents an unconditional call for performing an action.

The machine learning model may use various features including a type of question associated with an input comment, n-grams associated with the comment with an indication of whether the n-gram is from a question sentence or from an answer sentence, information identifying a part of speech associated with an n-gram, indication of whether terms of the comment match an action expression, indication of whether the comment includes a representation of an action word, a location of action words in a sentence, forms of verbs of in the comment, and so on.

The features and advantages described in this summary and the following detailed description are not all-inclusive. Many additional features and advantages will be apparent to one of ordinary skill in the art in view of the drawings, specification, and claims hereof.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Environment

Figure 1:
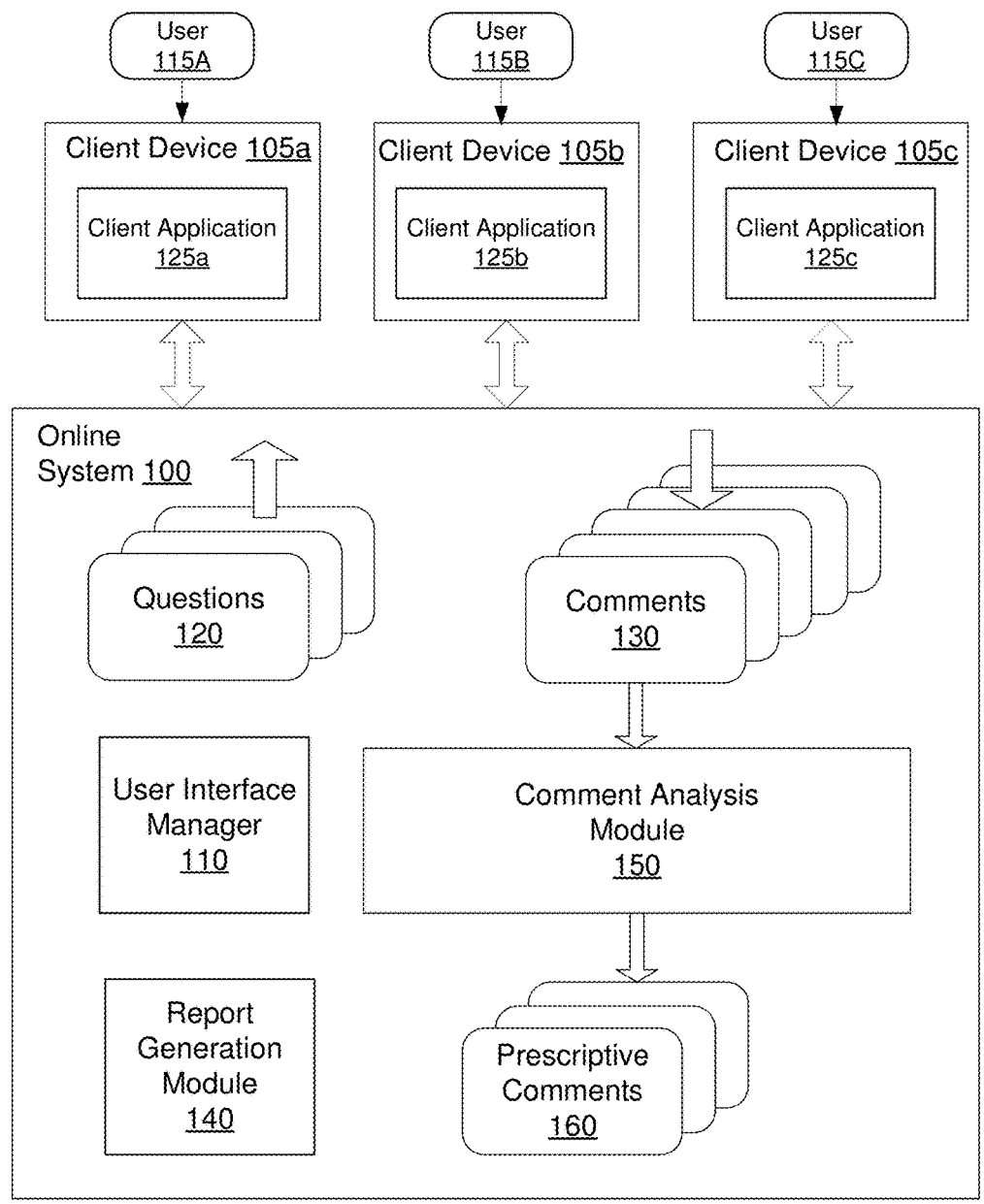
FIG. 1 is a diagram of a system environment for receiving and analyzing comments from users, in accordance with an embodiment of the invention.

FIG. 1 is a diagram of a system environment for receiving and analyzing comments from users, in accordance with an embodiment of the invention. The users 115 interact with the online system 100 using client devices 105. Some embodiments of the online system 100 and client devices 105 have different and/or other modules than the ones described herein, and the functions can be distributed among the modules in a different manner than described here.

The online system 100 comprises a user interface manager 110, a comment analysis module 150, and a report generation module 140. The online system 100 may include other modules than those shown in FIG. 1, for example, modules shown in FIG. 4.

The user interface manager 110 is configured to present user interfaces via client devices 105. The online system 100 is configured to receive comments 130 from a set of users based on user interactions with the online system 100. The online system 100 may be associated with an organization, for example, an enterprise. Accordingly, users of the online system may be members of an organization, for example, employees of an enterprise. The users of the online system 100 may comprise any group of users, for example, an online community.

In an embodiment, the online system 100 is configured to presented surveys to the user requesting information from the users in the form of comments. In some embodiments, the online system 100 allows users to interact with each other. For example, the online system 100 may be configured to allow employees of an enterprise or members of an organization to interact with each other. The online system 100 may allow employees of an enterprise to interact with a subset of the employees of the enterprise, for example, executives of the enterprise or human resources department of the enterprise.

The client device 105 used by a user 115 for interacting with the online system 100 can be a personal computer (PC), a desktop computer, a laptop computer, a notebook, a tablet PC executing an operating system, for example, a Microsoft Windows®-compatible operating system (OS), Apple OS X®, and/or a Linux distribution. In another embodiment, the client device 105 can be any device having computer functionality, such as a personal digital assistant (PDA), mobile telephone, smartphone, wearable device, etc.

The client device 105 executes a client application 125 that allows users to interact with the online system 100. For example, the client application 125 executing on the client device 105 may be an internet browser that interacts with the online system using the hypertext transfer protocol (HTTP) and receives markup documents, for example, documents of hypertext markup language (HTML) provided by the user interface manager 110 of the online system. The internet browser of the client device 105 renders user interfaces configured by the user interface manager 110 using the markup language document. In other embodiments, the client application 125 is a proprietary application used by the enterprise associated with the online system that interacts with the online system 100 using a proprietary protocol.

The client application 125 presents a user interface to allow the user 115 to interact with the online system 100. The user interface allows the user to perform various actions associated with the online system 100 and view information provided by the online system 100. In an embodiment, the online system 100 configures a user interface for presenting to the user 115 via the client application 125. The user interface presents one or more widgets that allow a user to enter comments, for example, a text box. The comments may be specified as natural language sentences.

In an embodiment, the user interface receives comments from users in response to questions presented to the user by the online system or by other users via the online system 100. The user interface presents a widget configured to display text representing one or more questions 120 to the users. Some comments 130 received by the online system 100 are in response to questions 120 presented to the user providing the comment. Some comments may not be associated with any question and represent information provided by users. For example, a user may post a comment providing information about a particular topic without being asked any question. A user may direct a comment to another user as part of a conversation.

The comment analysis module 150 analyzes comments 130 and associates the comments with additional information that is not explicitly provided by the user providing the comment. For example, the comment analysis module 150 may associate a comment from a user is associated with a question presented to the user. As another example, the comment analysis module 150 determines whether a comment 130 is a prescriptive comment 160. A prescriptive comment is a comment that specifies an actionable item. The specified action may be intended for the organization, a department of the organization, for specific users of the organization, and so on. For example, a user may provide a comment "We need longer breaks." This comment is a prescriptive comment that specifies an actionable item for the organization of for users representing management of the organization to take some action to increase the length of breaks. As another example, a user may provide a comment "The meeting was very useful." This comment simply provides some information but does not specify any actionable item.

In an embodiment, the comment analysis module 150 classifies comments based on a plurality of categories. A category may represent prescriptive comments and another category may represent non-prescriptive comments. The comment analysis module 150 may further classify prescriptive comments as unconditional prescriptive or conditional prescriptive. A conditional prescriptive comment is a comment that is associated with a question. Accordingly, a conditional prescriptive comment is provided in response to a question presented to the user. An unconditional prescriptive comment is a comment that is not-associated with a question presented to a user. Accordingly, a prescriptive comment that is not a conditional prescriptive comment is classified as an unconditional prescriptive comment.

The report generation module 140 analyzes data of the online system 100 and generates reports based on the data. For example, the report generation module 140 may generate reports describing comments 130 received from users. The report generation module 140 may generate a report that categorizes comments based on various subgroups of users of the online system, for example, various departments within an enterprise. The report generation module 140 may generate a report that categorizes the comments based on whether a comment is prescriptive or non-prescriptive.

FIG. 1 and the other figures use like reference numerals to identify like elements. A letter after a reference numeral, such as "105A," indicates that the text refers specifically to the element having that particular reference numeral. A reference numeral in the text without a following letter, such as "105," refers to any or all of the elements in the figures bearing that reference numeral (e.g. "105" in the text refers to reference numerals "105A" and/or "105N" in the figures).

The interactions between the client devices 105 and the online system 100 are typically performed via a network, for example, via the Internet. The network enables communications between the client device 105 and the online system 100. In one embodiment, the network uses standard communications technologies and/or protocols. The data exchanged over the network can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network can also include links to other networks such as the Internet.

Figure 2:
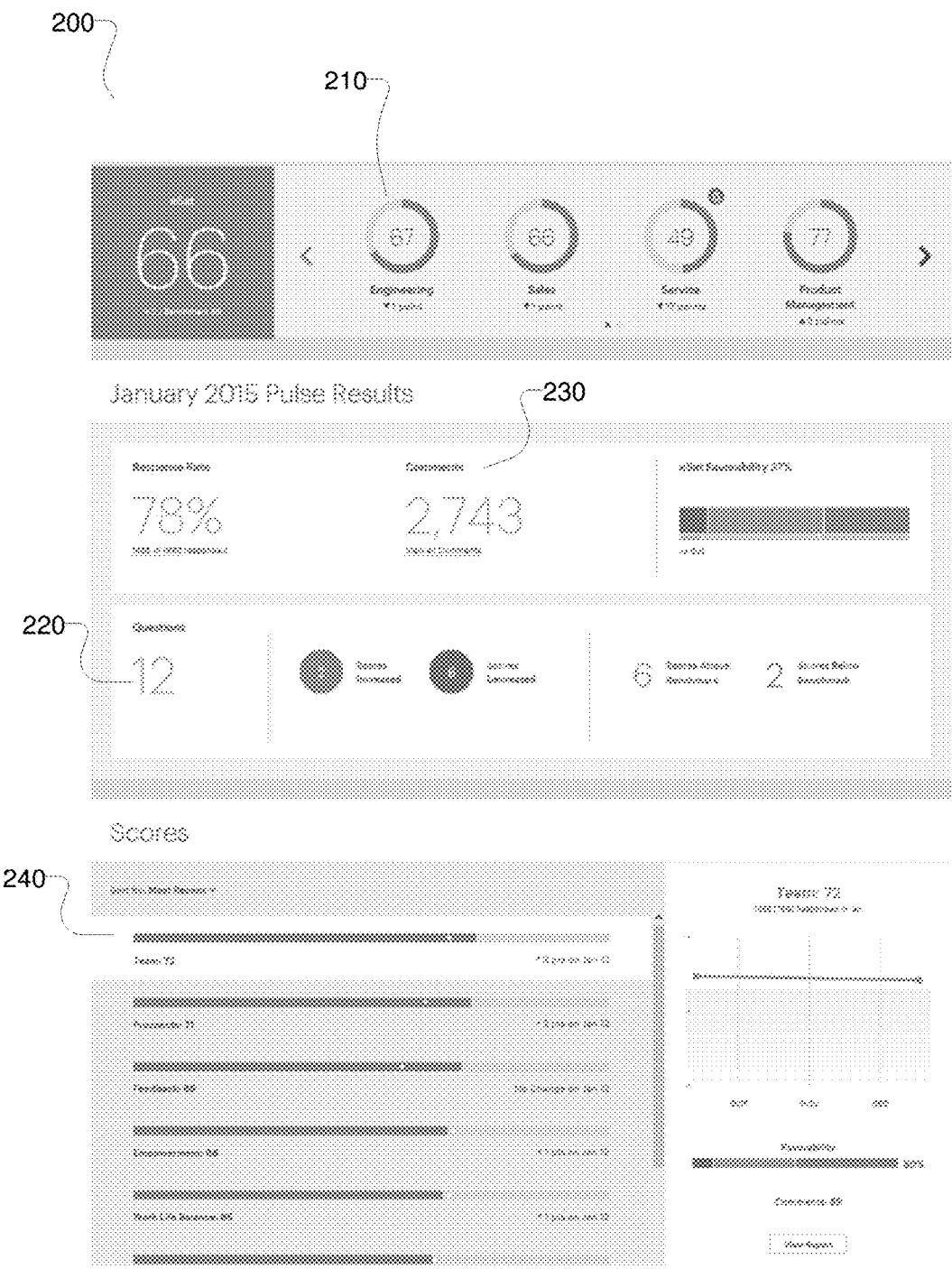
FIG. 2 illustrates an exemplary user interface for displaying analysis of data describing employees of an organization, in accordance with an embodiment of the invention.

FIG. 2 illustrates an exemplary user interface for displaying analysis of data describing employees of an organization, in accordance with an embodiment of the invention. The user interface 200 illustrated in FIG. 2 presents results of surveys presented to employees of an enterprise requesting feedback from the employees. The online system 100 determines a measure of satisfaction of the employees based on comments and feedback received from the employees. The measure of satisfaction is visualized using widgets 210. The user interface 200 presents information 220 describing comments received from the users. The user interface 200 presents information 220 describing questions presented to the users and information 230 describing comments received from the users. The user interface 200 presents reports 240 based on the results of the surveys, for example, distribution of various types of statistics across various departments of the organization.

Figure 3:
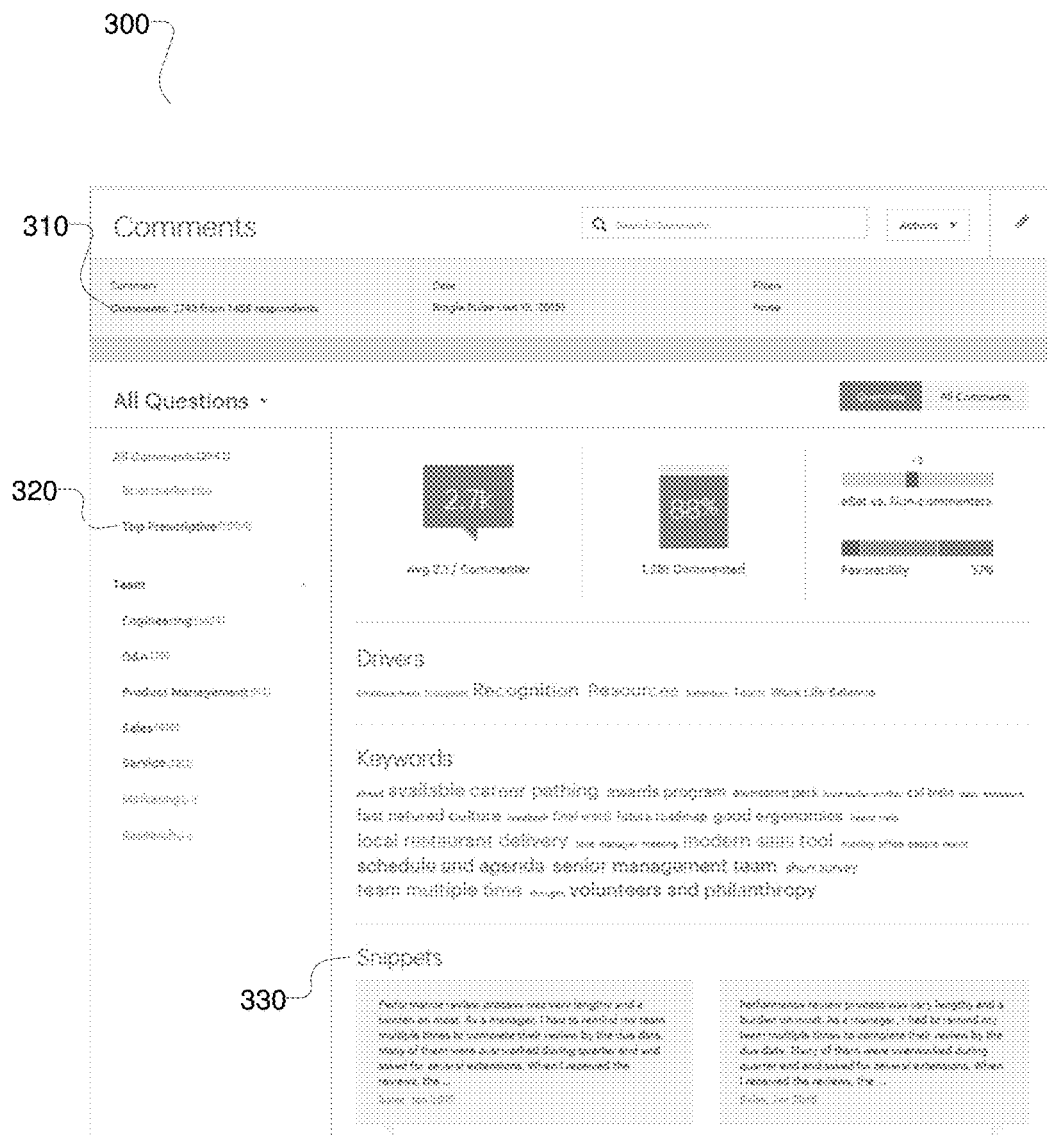
FIG. 3 illustrates an exemplary user interface for displaying analysis of comments received by the online system, in accordance with an embodiment of the invention.

FIG. 3 illustrates an exemplary user interface for displaying analysis of comments received and analyzed by an online system, in accordance with an embodiment of the invention. The user interface 300 presents statistics describing comments received in response to surveys presented to the user. The user interface 300 presents widget 320 for allowing users to retrieve highly ranked prescriptive comments. The user interface 300 presents snippets 330 from various comments selected by the user.

System Architecture

Figure 4:
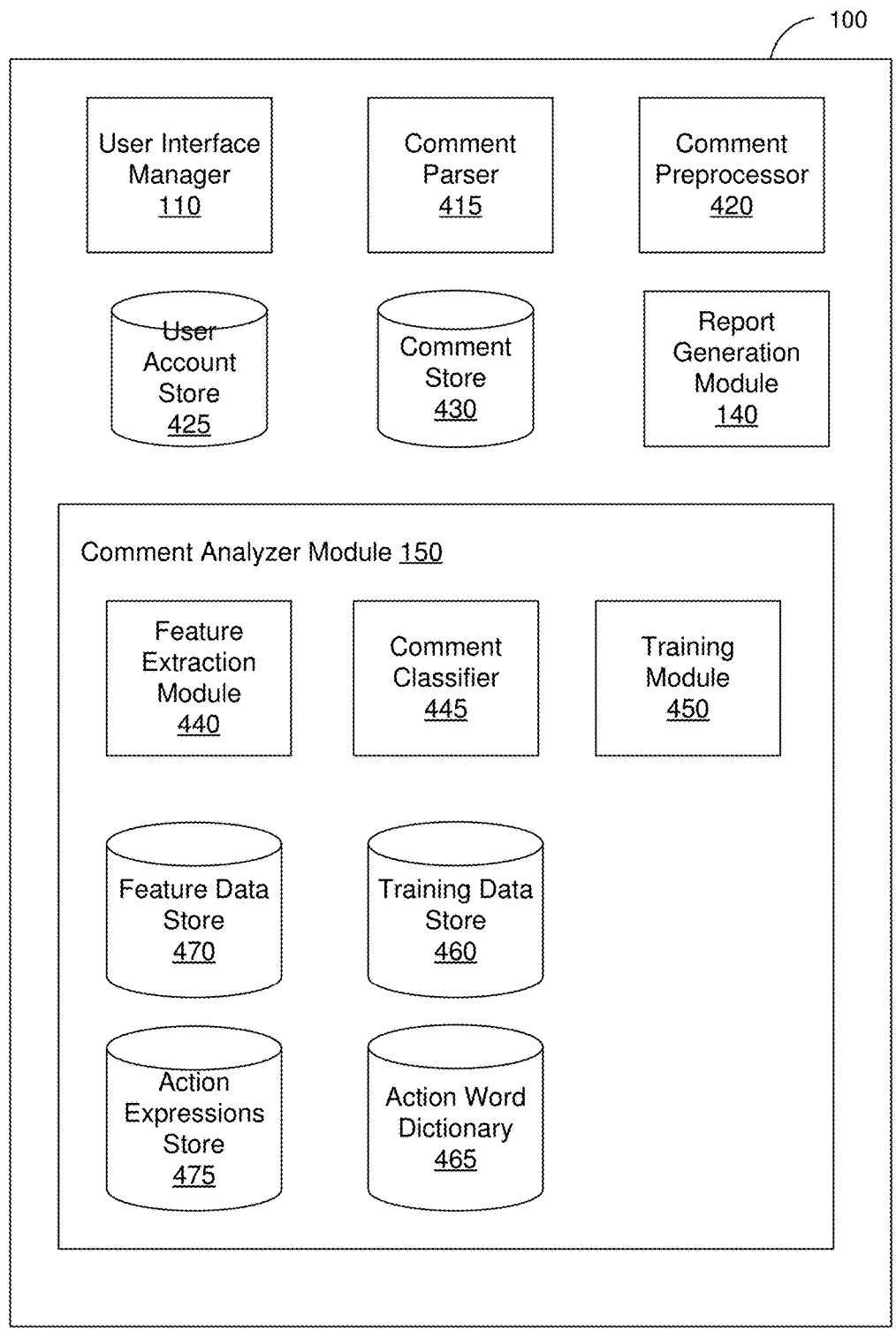
FIG. 4 is a diagram of system architecture of an online system for classifying comments, in accordance with an embodiment of the invention.

FIG. 4 is a diagram of system architecture of an online system for classifying comments, in accordance with an embodiment of the invention. The online system 100 includes user interface manager 110, a comment parser 415, a comment preprocessor 420, a user account store 425, a comment store 430, a report generation module 140, and a comment analyzer module 150. In other embodiments, the online system 100 may include additional, fewer, or different modules for various applications. Conventional components such as network interfaces, security mechanisms, load balancers, failover servers, management and network operations consoles, and the like are not shown so as to not obscure the details of the system. Actions indicated as being performed by a particular module may be performed by other modules.

The user account store 425 stores information describing users. The users may be users of the online system 100 and/or may be associated with an organization. The user account store 425 includes a unique identifier for each user. The user account store 425 may include credentials for each user to verify authenticity of sessions created by the users. For an online system 100 associated with an organization, the user account store 425 may include information describing a role of the user, a department associated with the user, one or more teams associated with the user within the organization, a location of the user associated with the organization, and so on. The user account store 425 may include the relation between the user and other users in the organization, for example, one or more managers of the user and if applicable, other users reporting to the user.

In other embodiments of online systems 100, the user account store 425 may include including biographic, demographic, and other types of descriptive information, such as age, work experience, educational history, interests, gender, hobbies or preferences, location, income, languages spoken, ethnic background, and the like. Embodiments of online system combine the information describing the users with information describing the comments to generate various types of reports. For example, the online system 100 may identify prescriptive comments received by the online system 100 and generate reports classifying the prescriptive comments along various dimensions such as by departments, by role in an organization, by location, by gender, and so on.

The comment store 430 stores information describing comments received by the online system 100. The comment store 430 may store the content of the comment using a representation of text data. In some embodiments, the online system 100 receives comments as a media object, for example, in an audio or video form. In these embodiments, the online system 100 transcribes the audio from the media object to generate a textual representation of the comment.

The comment store 430 stores various attributes of each comment. The comment store 430 may store information associating a comment with one or more users. For example, the comment store 430 stores information identifying a user that provided the comment. In some embodiments, a comment may be a part of a conversation thread between a plurality of users. In these embodiments, the comment store 430 stores information identifying the plurality of users associated with the conversation. The comment store 430 may also store relations between the comment and other comments in the conversation, for example, a comment that occurred before the comment in the conversation and a comment that occurred after the comment in the conversation.

In some embodiments, the online system 100 receives comments in response to surveys presented to the user requesting the user to provide information. The user interface manager 110 presents the user with a survey comprising one or more questions requesting answers from the user. The survey also allows a user to provide information that is not associated with specific questions, for example, by allowing the user to enter general comments about the organization or a specific event or any particular issue. The online system 100 tracks whether a comment was provided in response to a particular question. Accordingly, the comment store 430 may store information associating a comment with a question. The comment store 430 may store information associating the comment with a particular survey and a question within the survey. In an embodiment, the comment store 430 stores a boolean flag indicating whether the comment is associated with a question or not.

In an embodiment, one or more of the stores of the online system 100, for example, user account store 425 and comment store 430 are implemented using relational databases. For example, the user account store 425 may comprise one or more database tables storing user attributes as columns of the database tables. Similarly, a comment store may store comments and attributes of comments using one or more database tables. In an embodiment, the database tables storing comments information refer to user accounts in the database tables storing user accounts, for example, using foreign key relationships. Accordingly, the database associates each comment with one or more users, for example, the user who provided the comment, a user to whom a comment is directed if the comment is part of a conversation, and so on. The database may receive queries that join the comment information with the user information to generate reports that describe users associated with the comments.

The user interface manager 110 as described in relation to FIG. 1 configures user interfaces for allowing users to interact with the online system 100. In an embodiment, the user interface manager 110 generates markup language documents, for example, HTML documents and sends for display via a client application executing on a client device 105. The user interface manager 110 configures markup language documents that include various widgets, for example, widgets for presenting questions represented as text to a user and widgets for receiving comments as text inputs.

The report generation module 140 generates reports for display via the client device 105. In an embodiment, the report generation module 140 stores database queries corresponding to each report. The database queries process data stored in the various data stores of the online system 100. The report generation module 140 further allows users to modify existing queries or enter new queries to generate new reports. For example, the report generation module 140 may present results of executing a particular report and allows the user to specify filters to modify the result, to select specific columns of the report to display, or to specify a type of visualization used for presenting the results. The user interface manager renders for display, reports generated by the report generation module 140.

The comment parser 415 parses comments to extract various types of information describing the comment. The comment parser 415 generates data structures representing the information obtained from each comment. These data structures are used by other modules of the online system, for example, by the comment analyzer module 150. The comment parser 415 splits a comment into individual sentences. The comment parser 415 parses each individual sentence to identify different parts of speech of the sentence. The comment parser 415 tags the various phrases or keywords representing the parts of speech with appropriate tag identifying the corresponding part of speech. The comment parser 415 further identifies various n-grams from the sentences. An n-gram is a continuous sequence of n items from a sentence, where n is a numeric value, for example, 1, 2, 3, or more. The comment parser 415 also parses any questions associated with the comment.

The comment preprocessor 420 performs various types of preprocessing of the comments before the comments are analyzed by the comment analyzer module 150. The comment preprocessor 420 introduces markers that identify a start of a sentence. The marker may be represented as a position in the sequence of keywords represented by the comment. For example, if a comment includes four sentences, the comment preprocessor 420 marks the beginning of each of the four sentences. The comment preprocessor 420 performs stemming of the words to identify the root forms of the words. The comment preprocessor 420 removes stop words. In an embodiment, the comment parser 415 and the comment preprocessor 420 interact with each other to build the data structure representing the comment.

The comment preprocessor 420 determines if there is a question associated with a comment and creates and stores an association between the comment and the question. The comment preprocessor 420 determines if the comment was provided in response to a question, for example, a question asked in a survey. In an embodiment, the comment preprocessor 420 receives as input, a sequence of sentences that represent questions, answers, or sentences that do not represent either a question or an answer. The comment preprocessor 420 separates sentences that represent questions from sentences that represent answers from the sequence and creates associations between the answers and corresponding questions.

The comment preprocessor 420 identifies questions based on punctuations of the sentences. For example, the comment preprocessor 420 determines that sentences ending with a question mark, i.e., '?' are questions. The comment preprocessor 420 determines questions based on presence of keywords that represent questions, for example, "what", "when", "why", "where", "who", "how" and so on. The comment preprocessor 420 also uses the positions of these keywords to determine whether a sentence represents a question. For example, if the sentence begins with one of these keywords, the comment preprocessor 420 associates that sentence with a high likelihood that the sentence is a question. The comment preprocessor 420 associates various features of a sentence indicating that the sentence is a question with weights and aggregates the features to determine an overall score indicating whether the sentence is a question. If the score associated with the sentence is above a threshold, the comment preprocessor 420 marks the sentence as a question. The comment preprocessor 420 identifies sentences that follow a question and marks them as answers associated with the corresponding question that precedes the sentence.

The comment analyzer module 150 performs various types of analyses of comments. In an embodiment, the comment analyzer module 150 uses machine learning techniques to classify comments into different categories. The comment analyzer module 150 comprises a feature extraction module 440, a training module 450, a keyword tagging module 455, a training data store 460, an action word dictionary, and a feature data store 470. In other embodiments, the comment analyzer module 150 may include additional, fewer, or different modules for various applications. Actions indicated as being performed by a particular module may be performed by other modules.

An example of a machine learning model used by the comment analyzer module 150 is a classifier, for example, the comment classifier 445 that determines whether an input comment belongs to a category from a plurality of categories. The categories may specify whether the comment is a non-prescriptive comment or a prescriptive comment. In an embodiment, the comment classifier 445 is a support vector machine. Other embodiments use other machine learning techniques for processing comments, for example, tree-based models, kernel methods, neural networks, splines, or an ensemble of one or more of these techniques. The input into the comment classifier 445 include various features describing the comments. These features characterize comment and are extracted by the feature extraction module 440.

In an embodiment, the comment classifier 445 is trained by the training module 450. The training data store 460 stores training data sets for training of the comment classifier 445. The training data set includes training input data and expected output data. The training input data includes a training set of comments and feature data associated with these comments. The training data further includes an output or answer set of data indicating a desired classification of the comments. The training set of comments are preselected and classified, for example, using domain experts, binary classification of the comments from users, and/or an analysis of a user's interactions with the comments. Accordingly, the output of the comment classifier 445 for the training set of comments is known a priori.

The training module 340 trains the comment classifier 445 using the feature data generated from input data, output data, and/or other data sets by the feature extraction module 440 and stored in the training data store 310. In one embodiment, the training module 340 feeds the feature data for each comment along with the desired output data to train the comment classifier 445 using machine learning training techniques, such as supervised learning.

In one embodiment, the comment classifier 445 provides a coefficient to each type of feature that may occur for a comment. These features may include those described above and others. Each feature is assigned a value or converted into a value and modified by the coefficient. The resulting values are combined together (e.g., by a weighted aggregation or summation) resulting in a final classification. Using a training technique, the coefficients of these features are modified across the entire feature data input set and so that the output classification of each comment in the training set fits the output data of the training set. Initially, a default coefficient may be applied to each feature. Once the model is trained by the training module 450, the training module 450 may further verify the accuracy of the model using a separate verification data set that includes both feature data and output data.

Once the comment classifier 445 is trained (and validated), the comment classifier 445 uses the model to classify (non-training) any given set of comments received by the online system 100. The comment classifier 445 uses the same features from any input comment as the training set. These features are then fed into the comment classifier 445 to determine a classification of a comment.

In an embodiment, the comment classifier 445 determines scores for an input comment, each score representing a strength of association of the comment with one of a plurality of categories. The score may represent a probability that the comment corresponds to that category. The scores for the plurality of categories add to 1.0 for a comment since each comment belongs to at least one of the plurality of categories. The comment classifier 445 associates the input comment with the category having the highest score.

In an embodiment, the plurality of categories comprises at least two categories, one category indicating that the comment is prescriptive and another category indicating that the comment is non-prescriptive. In another embodiment, the comment classifier 445 determines whether an input comment is non-prescriptive, conditionally prescriptive, or unconditionally prescriptive. The comment classifier 445 determines that a comment is conditionally prescriptive if the comment is associated with a question, for example, if the comment was provided in response to that question. The comment classifier 445 determines that a comment is unconditionally prescriptive if the comment is determined to be prescriptive but is not associated with a question.

As described in further detail below, the feature data is generated by the feature extraction module 440 by transforming raw input data comprising comments received by the online system 100. Compared to the raw input data, the feature data may be more informative, not redundant, and more optimally facilitates the training of the comment classifier 445. Additionally, the feature data is in a format that can be accepted by the comment classifier 445.

The action word dictionary 465 stores information describing various action words that are indicative of a comment being prescriptive. An action word may also be referred to as an verb. Examples of action words include "walk", "change", "meet", "discuss", and so on. The action word dictionary stores words equivalent to each action word. These include words that are troponyms or synonyms of a given verb. A troponym of a verb is a verb that indicates the action of the original verb in a more precise manner. Accordingly a source verb performs an action in a generalized manner and the troponym verb performs the action in a specialized manner. The comment analysis module 150 processes an action word that occurs in a comment same as other words marked as being equivalent to the action word in the action word dictionary 465. As a result, if the comment classifier 445 was trained using a particular word, the comment classifier 445 is able to process other words that are equivalent to that particular word.

In an embodiment, all equivalent action words are mapped to a canonical representation. The canonical representation may be derived by lemmatization or by stemming of the words of the comment. The canonical representation represents a common base form for a word that may have several different forms. For example, the word "be" may be used as a canonical representation of words "is," "are," and "am." In an embodiment, the canonical representation of multiple synonyms is a single word that is equivalent to the synonyms. During training of the comment classifier 445, the comments are transformed so that the action words are replaced by their canonical representation. As a result, the comment classifier is trained to use the canonical representations of the action words. During classification of new comments, the action words of the new comments are replaced by their canonical representation. For example, assume that the training dataset includes a comment C1 with an action word W1. However, a new comment C2 being classified specifies a word W2 defined as being equivalent to word W1 in the action word dictionary 465. Assume that the canonical representation of both words W1 and W2 is Wn. The training module 450 trains the comment classifier 445 by replacing the word W1 of the training comment C1 with word Wn. During classification of the new comment C2, the action word W2 is replaced by the canonical representation Wn. As a result, even though the action word W2 specified in the new comment C2 was never used in the training data set, the classifier model 445 is able to classify the comment C2 since both words W1 and W2 have to the same canonical representation Wn.

The action expression store 475 stores expressions that represent actions that may be mentioned in comments. In an embodiment, the expressions are represented as regular expressions. An action expression may map to several different ways in which a user may specify an action. An example action expression "(A|[ ]+)need[s]?( |[a-zA-Z0-9]+)more[ ]" matches sentences comprising phrases "we need more . . . ", "he needs more", "they need more", "the department needs more . . . " and so on. Similarly, the expression "(A|[ ]+)there(|[a-zA-Z0-9]+) should[ ]" matches sentences comprising phrases "there should . . . ", for example, " there should be a discussion . . . ", " there should be more vacations . . . ", and so on. The feature extraction module 440 extracts occurrences of various action expressions in comments as features. The features extracted based on action expressions are also referred to as speech-act features.

The feature extraction module 440 transforms raw input data into feature data that may be used as input to the comment classifier 445. The feature extraction module 440 takes each comment received by the online system 100, and generates one or more items of feature data for that comment. This feature data is represented in a format that can be processed by the comment classifier 445. In general, the number and types of feature data generated by the feature extraction module 440 are standardized for each comment. This allows the comment classifier 445 to receive a consistent set of feature data for each comment.

The feature extraction module 440 extracts following features that are used by the comment classifier 445 for classifying comments. A feature indicates whether a comment is associated with a question or not. In an embodiment, this feature is represented by a flag having a particular value if the comment is associated with a question and another value if the comment is not associated with a question. The feature extraction module 440 extracts a feature comprising n-grams extracted from the comment. A feature comprises n-grams extracted from a question corresponding to the comment, if any. A feature represents an indication of whether the n-gram was obtained from the question or from the comment (or the answer to the question.) A feature represents an association between an n-gram and a part of speech of the sentence from which the n-gram was extracted. A feature indicates if an n-gram represents a start of a sentence. Accordingly, the feature extraction module 440 tags an n-gram with information indicating whether the n-gram corresponds to a start of a sentence.

The feature extraction module 440 extracts features indicating whether an action expression matches the comment. In an embodiment, the feature extraction module 440 represents this feature as a vector with a position corresponding to each action expression. The vector may have a particular value (for example, true) in a position associated with an action expression if the comment includes terms that match the action expression and the vector has another value (for example, false) in that position of the comment fails to match the action expression. The feature extraction module 440 extracts a feature indicating whether the comment includes an action word or an equivalent word from the action word dictionary.

The feature extraction module 440 extracts a feature indicating a location of a verb in a sentence of the comment. The position of the verb in the sentence often associated with the classification of the comments as prescriptive or non-prescriptive. For example, a verb in the beginning of a sentence is an indication of an imperative sentence, which in turn is a good indication of a prescriptive comment. Similarly, a verb at the end of a sentence is often an indication of a non-prescriptive comment.

The feature extraction module 440 extracts a feature indicating a form of the verb of a sentence occurring in the comment. For example, a present tense or a subjunctive form is typically a good indication of a prescriptive comment, whereas e.g. a simple past tense is likely to indicate an analytical mood and accordingly a non-prescriptive comment.

The feature data store 470 stores feature data generated by the feature extraction module 440 for non-training comments. The data stored in the feature data store 470 is fed to the comment classifier 445 in order to produce a classification for each comment.

In some embodiments, the system 100 is not an online system but a system that communicates with an online system to obtain the necessary user information. The system 100 may communicate with the online system, for example, using APIs provided by the online system. In these embodiments, some modules shown in FIGS. 1 and 4 may run in the system 100, whereas other modules may run in the remote online system. For example, the modules including the comment parser 415, comment preprocessor 420, and comment analyzer module 150 may run in the system 100 but modules report generation module 140 and user interface manager 110 may exist in a separate online system. This allows the online system 100 to receive comments collected by other systems and process them.

Overall Process

Figure 5:
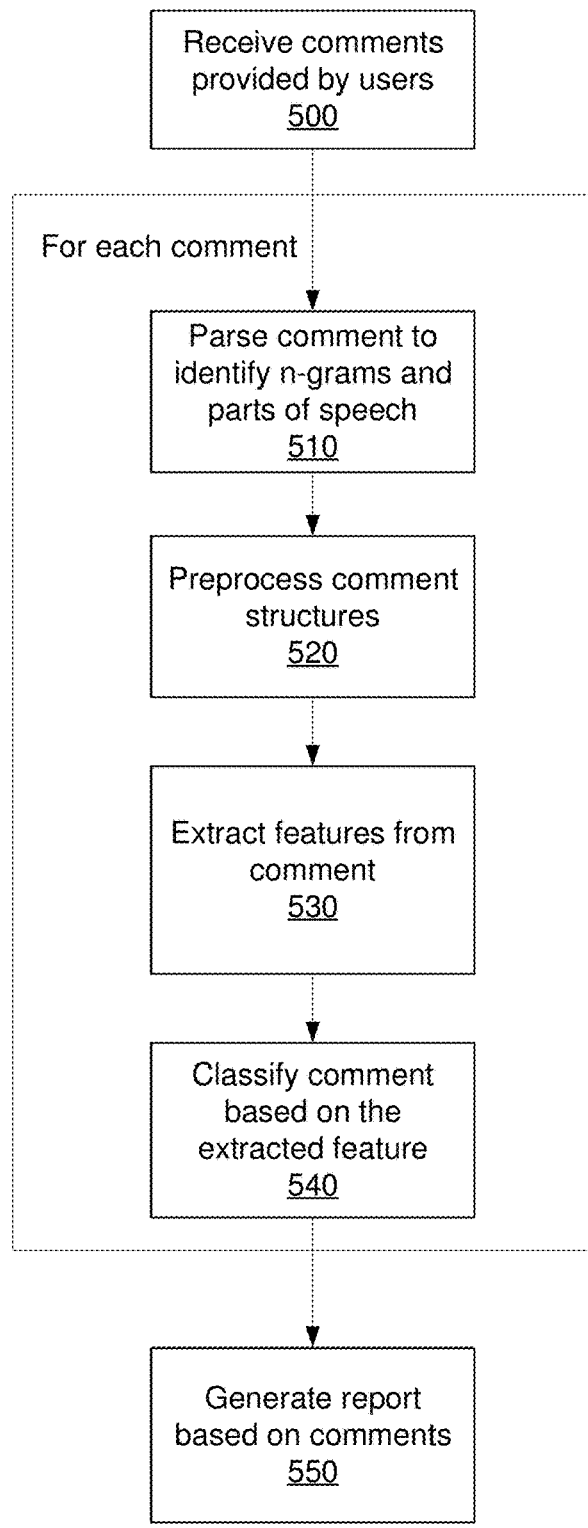
FIG. 5 shows a flowchart illustrating a process for identifying actionable comments from a set of comments, in accordance with an embodiment of the invention.

FIG. 5 shows a flowchart illustrating a process for identifying actionable comments from a set of comments, in accordance with an embodiment of the invention. The steps described herein may be executed by modules other than those indicated herein. Furthermore, the steps may be executed in an order different from that indicated in FIG. 5. For example, some steps may be performed in parallel or concurrently.

The online system 100 receives 500 comments provided by users. In an embodiment, these comments are directly received from the users via a user interface configured by the online system 100 and presented to the users via their client devices 105. In other embodiments, the comments are imported by the online system 100 from another system that interacts with the users to receive the comments. In an embodiment, the comments are obtained from users associated with an organization, for example, employees of an enterprise.

The online system 100 analyzes each of the comments to classify them. The comment parser 415 parses 510 the comments received. The comment parser 415 parses 510 the comments to identify n-grams in the comments. The comment parser 415 parses 510 also identifies various parts of speech in the sentences of the comments. The comment parser 415 associates each n-gram with the part of speech from which the n-gram was extracted. The comment parser 415 builds a data structure based on each comment for allowing other modules of the online system 100 to access information describing the comment. In an embodiment, the data structure representing the comment is a parse tree structure. In other embodiments the comment parser 415 further builds a data structure that provides easy access to the various components of a comment as well as different types of information associated with the comment.

The comment preprocessor 420 performs pre-processing of the comments to identify various types of information related to each comment. The comment preprocessor 420 determines whether the comment is associated with a question, for example, whether the comment was provided in response to a question. If the comment parser 415 determines that the comment is associated with a question, the comment parser 415 marks a flag indicating that the comment is associated with a question and creates an association of the comment with the identified question. The comment preprocessor 420 performs other types of processing described herein, for example, identifying start of sentences, removing stop words from the comments, stemming of the words, and so on.

The feature extraction module 440 extracts 530 various features of the comments. The features extracted 530 include the various features described herein, for example, n-grams associated with the comment with an indication of whether the n-gram is from a question sentence or from an answer sentence, information indicating a part of speech associated with each n-gram, indication of whether terms of the comment match an action expression, indication of whether the comment includes a representation of an action word, location of action words in a sentence, forms of verbs of a sentence of the comment, and so on.

The comment analyzer module 150 applies the machine learning model encoded in the comment classifier 445 to the comment. Accordingly, the comment classifier 445 receives the extracted 530 features as input and classifies 540 the comment based on these features. In an embodiment, the comment classifier 445 classifies the comment as belonging to a category from a plurality of categories. The plurality of categories include a category the indicates that the comment is prescriptive comment and another category that indicates that the comment is non-prescriptive. In another embodiment, the category of prescriptive comments further comprises a category of conditional prescriptive comments and a category of unconditional prescriptive comments. Accordingly, the comment classifier 445 classifies the comment as being either an non-prescriptive comment, a conditional prescriptive comment, or an unconditional prescriptive comment.

The report generation module 140 generates reports based on the classification of comments. For example, the report generation module 140 may simply list all prescriptive comments for analysis by an expert. The report generation module 140 may further analyze the comments based on various attributes, for example, count of comments belonging to each category, prescriptive comments classified by the department, based on functions of the users providing the comment, changes in distribution over time, and so on. The report generation module 140 presents the reports for analysis by a user via the client device 105.

The ability to identify prescriptive comments allows experts to filter the comments that are more likely to be of interest to members of the organization such as human resources, executives, or management. The experts can filter these comments for further review. Furthermore, the online system 100 may generate reports based on these comments. Accordingly, embodiments of the invention increase efficiency of report generation and analysis of the comments since only prescriptive comments are analyzed, thereby reducing the amount of data that is processed.

The techniques disclosed herein are described in relation to natural language comments. However, the techniques can be applied to textual information in general and are not limited to natural language comments. For example, the comment analyzer module 150 may be trained using general textual information to generate a machine learning model that classifies any input textual information to determine whether the input text is prescriptive or not. In this embodiment, the feature extraction module 440 extract features that are applicable to general text input. For example, the feature extraction module 440 extracts n-grams associated with the text input, a location of the action word in a sentence, a form of a verb of a sentence, and so on.

Alternative Applications

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

We claim:

1. A method for classifying comments, the method comprising:
    receiving, by an online system, a plurality of comments provided by users associated with an organization;
    inputting a first comment of the plurality of comments and a second comment of the plurality of comments to a model trained using machine learning, the model configured to assign a classification to an input comment received from a user;
    determining, using the model, that the first comment is a conditionally prescriptive comment representing a prescriptive comment provided in response to a question presented to the user, and responsively assigning the first comment to a first category, wherein the prescriptive comment is a comment that specifies an action to be performed;
    determining, using the model, that the second comment is an unconditionally prescriptive comment representing a prescriptive comment that is not associated with a question presented to the user, and responsively assigning the second comment to a second category;
    receiving output from the model, the output comprising indicia that the first comment is assigned to the first category and the second comment is assigned to the second category;
    generating a report based on the output; and
    sending for presentation, results of the report.

2. The method of claim 1, wherein features used for the model comprise n-grams associated with a given comment of the plurality of comments with an indication of whether an n-gram is from a question sentence or from an answer sentence.

3. The method of claim 1, wherein features used for the model comprise n-grams associated with a given comment of the plurality of comments with information indicating a part of speech associated with an n-gram.

4. The method of claim 1, wherein features used for the model comprise an indication of whether terms of a given comment match an action expression.

5. The method of claim 1, wherein features used for the model comprise an indication of whether a given comment of the plurality of comments includes a representation of an action word.

6. The method of claim 5, wherein features used for the model comprise a location of the action word in a sentence.

7. The method of claim 1, wherein features used for the model comprise a form of a verb of a sentence of a given comment.

8. The method of claim 1, wherein the plurality of comments comprises comments received from users in response to a survey presented to the users.

9. A non-transitory computer-readable storage medium storing instructions that cause a processor to:
receive a plurality of comments provided by users associated with an organization;
input a first comment of the plurality of comments and a second comment of the plurality of comments to a model trained using machine learning, the model configured to assign a classification to an input comment received from a user;
determine, using the model, that the first comment is a conditionally prescriptive comment representing a prescriptive comment provided in response to a question presented to the user, and responsively assigning the first comment to a first category, wherein the prescriptive comment is a comment that specifies an action to be performed;
determine, using the model, that the second comment is an unconditionally prescriptive comment representing a prescriptive comment that is not associated with a question presented to the user, and responsively assigning the second comment to a second category;
receive output from the model, the output comprising indicia that the first comment is assigned to the first category and the second comment is assigned to the second category;
generate a report based on the output; and
send for presentation, results of the report.

10. The non-transitory computer-readable storage medium of claim 9, wherein features used for the model comprise n-grams associated with a given comment of the plurality of comments with an indication of whether an n-gram is from a question sentence or from an answer sentence.

11. The non-transitory computer-readable storage medium of claim 9, wherein features used for the model comprise n-grams associated with a given comment of the plurality of comments with information indicating a part of speech associated with an n-gram.

12. The non-transitory computer-readable storage medium of claim 9, wherein features used for the model comprise an indication of whether terms of a given comment of the plurality of comments match an action expression.

13. The non-transitory computer-readable storage medium of claim 9, wherein features used for the model comprise an indication of whether a given comment of the plurality of comments includes a representation of an action word.

14. The non-transitory computer-readable storage medium of claim 9, wherein features used for the model comprise a form of a verb of a sentence of a given comment of the plurality of comments.

15. A computer system comprising:
a computer processor; and
a non-transitory computer-readable storage medium storing instructions for execution by the computer processor, the instructions when executed by the computer processor cause the computer processor to:
receive a plurality of comments provided by users associated with an organization;
input a first comment of the plurality of comments and a second comment of the plurality of comments to a model trained using machine learning, the model configured to assign a classification to an input comment received from a user;
determine, using the model, that the first comment is a conditionally prescriptive comment representing a prescriptive comment provided in response to a question presented to the user, and responsively assigning the first comment to a first category, wherein the prescriptive comment is a comment that specifies an action to be performed;
determine, using the model, that the second comment is an unconditionally prescriptive comment representing a prescriptive comment that is not associated with a question presented to the user, and responsively assigning the second comment to a second category;
receive output from the model, the output comprising indicia that the first comment is assigned to the first category and the second comment is assigned to the second category;
generate a report based on the output; and
send for presentation, results of the report.

16. The system of claim 15, wherein features used for the model comprise n-grams associated with a given comment of the plurality of comments with an indication of whether an n-gram is from a question sentence or from an answer sentence.

17. The system of claim 15, wherein features used for the model comprise n-grams associated with a given comment of the plurality of comments with information indicating a part of speech associated with an n-gram.

18. The system of claim 15, wherein features used for the model comprise an indication of whether terms of a given comment of the plurality of comments match an action expression.

19. The system of claim 15, wherein features used for the model comprise an indication of whether a given comment of the plurality of comments includes a representation of an action word.

20. The system of claim 15, wherein features used for the model comprise a form of a verb of a sentence of a given comment of the plurality of comments.

* * * * *